United States Patent Office 2,716,650
Patented Aug. 30, 1955

2,716,650

PREPARATION OF TROPIC ACID AND RELATED COMPOUNDS

Frederick F. Blicke, Ann Arbor, Mich., assignor to Regents of The University of Michigan, Ann Arbor, Mich., a corporation of Michigan No Drawing. Application January 19, 1951,
Serial No. 206,920

14 Claims. (Cl. 260—332.2)

This invention relates to an improved process for the production of tropic acid and derivatives and analogs thereof, which are important intermediates in the synthesis of atropine and certain synthetic antispasmodics. In particular, this invention relates to a process for preparing acids of the formula

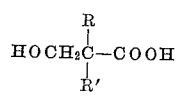

wherein R is an aromatic hydrocarbon group of 1–2 rings having less than 15 carbon atoms, a thienyl group or a lower-alkylated thienyl group, and R' is hydrogen or an organic radical inert to the action of the reagents employed.

The process is carried out by causing formaldehyde to react with a salt of an acid having the formula X—Mg—CRR'—COOH, wherein X is halogen, and hydrolyzing the resulting complex. The organometallic intermediate, X—Mg—CRR'—COOH, is prepared by the reaction of an acid HCRR'—COOH or a salt thereof with magnesium and an alkyl halide. The entire synthesis can be performed in essentially one operation and can be carried out in the same reaction vessel without isolation of any intermediates.

The process is represented by the following equations:

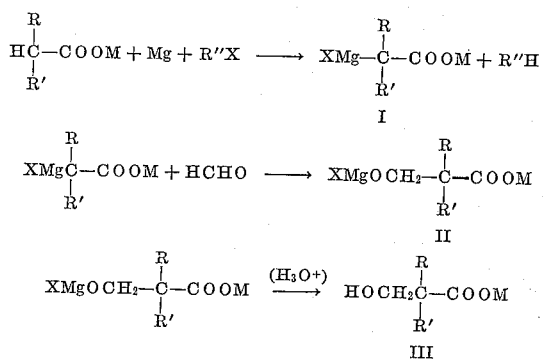

In these equations M represents a cation, including hydrogen, a metal ion or the ammonium ion, R" represents a lower-alkyl group, X represents halogen, including chlorine, bromine or iodine, and R and R' have the meanings given previously. It should be noted that if the free acid is used as the starting material (M=H), the acid hydrogen will be replaced by MgX in the formation of the Grignard complex I (M=MgX). It is preferred, therefore, to start with a salt of the acid (M=ammonium or a metal ion) in order to consume smaller quantities of magnesium and alkyl halide. The choice of salt is immaterial, although the ammonium, alkali metal and alkaline earth metal salts, in particular the ammonium, sodium and calcium salts, are preferred because of their ready availability. In the lower-alkyl halide, R"X, R" can be any alkyl group having about 1–6 carbon atoms, although secondary alkyl halides are preferred, in particular isopropyl chloride.

The compounds prepared by the new process are beta-hydroxypropionic acids substituted in the alpha-position by the groups R and R'. R represents an aromatic hydrocarbon group of 1–2 rings having less than 15 carbon atoms, or thienyl or alkylated thienyl groups. The preferred radicals are phenyl, naphthyl, xenyl, 2-thienyl, 3-thienyl and lower-alkylated derivatives of these radicals. R' represents hydrogen or an organic radical inert to the action of the reagents employed, in this case the Grignard reagent and formaldehyde. Such inert groups include lower-alkyl and lower-alkoxy groups having about 1–6 carbon atoms, 2- and 3-thienyl groups, and aromatic hydrocarbon, aromatic hydrocarbon-oxy and aromatic hydrocarbon-lower-alkyl groups, wherein the aromatic hydrocarbon moiety is the same as in the definition for the group R.

This new process for preparation of acids of the type, HOCH$_2$—CRR'—COOH, has certain definite advantages over those proposed in the chemical literature. All of the prior art processes require a plurality of steps and necessitate the isolation of intermediates in contrast to the new process which can be carried out essentially in one operation. In the more successful syntheses of tropic acid as in that of U. S. Patent 2,390,278, an alkyl ester of alpha - hydroxymethylene - phenylacetic acid, HOCH=C(C$_6$H$_5$)—COOR, has been used as an intermediate. This intermediate is not readily available and must be prepared by an acetoacetic ester type condensation between an ester of phenylacetic acid and an alkyl formate in the presence of a basic condensation reagent. The double bond of the alkyl alpha-hydroxymethylene-phenylacetate must then be reduced and the resulting alkyl tropate saponified. Thus four steps are in general necessary in preparing tropic acid by this method starting from phenylacetic acid: (1) esterification, (2) condensation with an alkyl formate, (3) reduction and (4) saponification. Moreover, this prior art method is obviously not applicable to the preparation of alpha,alpha-disubstituted beta-hydroxypropionic acids.

The new process is most conveniently carried out as follows: the magnesium, generally in the form of turnings, is rendered active by conventional methods for initiating a Grignard reaction, for instance by starting a reaction between the magnesium and a small portion of an alkyl halide. A crystal of iodine sometimes aids in starting the reaction. The entire reaction is carried out in an anhydrous medium, preferably diethyl ether. Once the magnesium has started to react, the salt of the arylacetic acid, HCRR'COOH, is added, followed by the alkyl halide, R"X, and the mixture is stirred and heated until the hydrocarbon R"H ceases to be liberated. When R' is other than hydrogen, the eventual yields can often be improved by introduction of additional magnesium and alkyl halide at this point before addition of the formaldehyde. The resulting suspension or solution of the organometallic intermediate I, is then ready to be treated with formaldehyde. Formaldehyde is a gas, and it can be caused to react by passing the gas over or into the surface of the agitated reaction mixture. It is more convenient, however, to use the solid polymerized forms of formaldehyde, viz. trioxane or paraformaldehyde which decompose into the gaseous monomer upon heating. The apparatus is readily arranged so that at the proper time a vessel of the polymer can be heated to bring gaseous formaldehyde into contact with the reaction mixture. For the best results a large excess of formaldehyde is used. After reaction with the formaldehyde, the reaction mixture is hydrolyzed by adding water and dilute acid, whereby the desired substituted beta-hydroxypropionic acid III is liberated. The ether layer is separated from the aqueous layer and the latter extracted with ether. The combined ether fractions contain the acid III. The acid III is best purified by extraction of the ether solution with sodium carbonate solution. This serves to separate any neutral material from the acid III, the latter being extracted by the sodium carbonate.

The following examples illustrate the present invention, but it is to be understood that these examples are given by way of illustration and not of limitation.

*Example 1*

*Tropic acid.*—Twelve and two tenths grams (0.50 mole) of magnesium was placed in a thoroughly dried one-liter, three-necked flask fitted with a condenser, dropping funnel and stirrer. Enough dry ether was added to cover the magnesium, followed by the addition of about 1 cc. of ethyl bromide. After the reaction had begun there were added, successively, about 200 cc. of dry ether, 39.5 g. (0.25 mole) of finely powdered sodium phenylacetate (which had been dried at 130° C.) and 150 cc. of ether. The mixture was stirred, and 39.3 g. (0.50 mole) of isopropyl chloride, dissolved in 125 cc. of dry ether, was added dropwise at such a rate that the mixture continued to reflux. After the addition of the isopropyl chloride, the mixture was stirred and refluxed until no more gas was evolved (about two to two and one-half hours). The mixture was cooled to 0° C., and the dropping funnel was replaced by a gas inlet tube. This tube should be at least ½ inch in diameter and should extend to about ¾ inch above the surface of the liquid in the reaction flask. The tube was fused to the upper part of the bulb of a 500 cc. flask which contained 60 g. of paraformaldehyde. The latter substance had been dried for at least two days in a desiccator over phosphorus pentoxide. The mixture was stirred, and the formaldehyde was vaporized by heating the container to 180–200° in an oil-bath. A slow stream of dry nitrogen was passed through the flask which contained the formaldehyde in order to facilitate the transference of the formaldehyde into the reaction mixture. During the addition of the formaldehyde, the reaction mixture was kept at 10° C. with the aid of an ice-bath. The introduction of the formaldehyde required about two and one-half to three hours. The mixture was cooled, and water was added very slowly. After the addition of acid, the ether layer was separated, and the aqueous layer was extracted with ether. The combined ether layers were extracted with sodium carbonate solution. After acidification of the sodium carbonate solution, the tropic acid was extracted with ether. The extracts were dried over magnesium sulfate, and the solvent was removed. The crude tropic acid weighed 27.1 g. (65.5%); M. P. 111°. The product was recrystallized from 475 cc. of benzene; yield 24.0 g. (59.5%) of tropic acid; M. P. 116–117°.

*Example 2*

Tropic acid was prepared according to the method of Example 1, but using calcium phenylacetate instead of sodium phenylacetate. This afforded considerable practical advantage since the calcium salt, unlike the sodium salt, is not hygroscopic.

*Example 3*

Tropic acid was prepared according to the method of Example 1, but using ammonium phenylacetate instead of sodium phenylacetate. From 115 g. (0.75 mole) of ammonium phenylacetate 87 g. (71%) of tropic acid was obtained. The ammonium salt of phenylacetic acid is also non-hygroscopic.

*Example 4*

*Alpha-(2-thienyl)-beta-hydroxypropionic acid* was prepared according to the method described in Example 1 from 12.2 g. (0.5 mole) of magnesium, 41.0 g. (0.25 mole) of sodium 2-thienylacetate in 350 cc. of ether, and 39.3 g. (0.5 mole) of isopropyl chloride dissolved in 125 cc. of ether, to which 45.0 g. (1.5 moles) of depolymerized paraformaldehyde was added. There was thus obtained 29.5 g. (68.5%) of alpha-(2-thienyl)-beta-hydroxypropionic acid, M. P. 95–96° C. when recrystallized from benzene.

*Example 5*

*Alpha-(p-xenyl)-beta-hydroxypropionic acid* was prepared according to the method described in Example 1 from 18.5 g. (0.76 mole) of magnesium, 89.0 g. (0.38 mole) of sodium p-xenylacetate, 60.0 g. (0.76 mole) of isopropyl chloride and 700 cc. of ether, to which 68.4 g. (2.28 moles) of depolymerized paraformaldehyde was added. There was thus obtained 71.4 g. (77.6%) of alpha-(p-xenyl)-beta-hydroxypropionic acid, M. P. 207–209° C. (dec.) after recrystallization from isopropyl alcohol.

Neut. equiv. calcd. for $C_{15}H_{14}O_3$: 242.3. Found: 241.2.

*Example 6*

*Alpha,alpha-diphenyl-beta-hydroxypropionic acid.*—To a mixture of 31.6 g. (1.3 moles) of magnesium, 117.1 g. (0.5 mole) of sodium diphenylacetate and 1100 cc. of ether, was added 102.0 g. (1.3 moles) of isopropyl chloride in 300 cc. of ether. The mixture was refluxed for three hours, cooled to 0° C., and 90 g. (3.0 moles) of paraformaldehyde was depolymerized and introduced into the reaction mixture with a slow stream of nitrogen. When all of the formaldehyde had been added the mixture was refluxed for three hours. The reaction mixture was worked up as described in Example 1 to give 109.5 g. (90.5%) of alpha,alpha-diphenyl-beta-hydroxypropionic acid, M. P. 158–159° C. when recrystallized from isopropyl alcohol.

Neut. equiv. calcd. for $C_{15}H_{14}O_3$: 242.3. Found: 242.1.

*Example 7*

*Alpha-benzyl-alpha-phenyl-beta-hydroxypropionic acid.*—Magnesium (6.2 g., 0.225 mole), sodium benzylphenylacetate (31.6 g., 0.128 mole) and 150 cc. of ether were placed in a 500 cc. flask, and isopropyl chloride (20.0 g., 0.255 mole), dissolved in 50 cc. of ether, was slowly added. Only 30% of the theoretical amount of propane gas, produced during the reaction, was collected, so additional magnesium and isopropyl chloride (equal to the quantities originally used) and 200 cc. of ether, were added. The total quantity of propane gas collected amounted to 49% of the calculated amount. Paraformaldehyde (45 g., 1.5 moles) was then depolymerized into the mixture, which was worked up as usual giving 7.3 g. (22%) of alpha-benzyl-alpha-phenyl-beta-hydroxypropionic acid, M. P. 188–189° C. when recrystallized from toluene.

Neut. equiv. calcd. for $C_{16}H_{16}O_3$: 256.3. Found: 254.9.

*Example 8*

*Alpha-phenyl-alpha-phenoxy-beta-hydroxypropionic acid.*—Isopropyl chloride (15.7 g., 0.2 mole), dissolved in 50 cc. of ether, was added to a mixture of 4.8 g. (0.2 mole) of magnesium, 25.0 g. (0.1 mole) of sodium phenylphenoxyacetic acid and 150 cc. of ether. After the mixture had refluxed for four hours, the same quantities of magnesium, isopropyl chloride and ether were added. The mixture was refluxed for five hours longer, cooled, 36.0 g. (1.2 moles) of formaldehyde was added, and the mixture was worked up as usual giving 6.8 g. (26.3%) of alpha-phenyl-alpha-phenoxy-beta-hydroxypropionic acid, M. P. 160–161° C. (dec.) when recrystallized from isopropyl alcohol.

Neut. equiv. calcd. for $C_{15}H_{14}O_4$: 258.3. Found: 260.0

According to the procedures described in the preceding examples the following compounds can be prepared:

*Alpha-phenyl-alpha-(2-thienyl)-beta-hydroxypropionic acid,* prepared from phenyl-(2-thienyl)acetic acid by way of the intermediate salt of an alpha-(2-thienyl)-alpha-carboxybenzylmagnesium halide.

*Alpha-bis(2-thienyl)-beta-hydroxypropionic acid,* prepared from bis(2-thienyl)acetic acid by way of the intermediate salt of an alpha-(2-thienyl)-alpha-carboxy-(2-thenyl)magnesium halide.

*Alpha-phenyl-alpha-methyl-beta-hydroxypropionic acid,* prepared from alpha-phenylpropionic acid by way of the intermediate salt of an alpha-methyl-alpha-carboxybenzylmagnesium halide.

*Alpha-(2-thienyl)-alpha-butyl-beta - hydroxypropionic acid,* prepared from alpha-(2-thienyl)caproic acid by way of the intermediate salt of an alpha-butyl-alpha-carboxybenzylmagnesium halide.

*Alpha-phenyl - alpha - ethoxy - beta - hydroxypropionic acid,* prepared from phenyl-ethoxyacetic acid by way of the intermediate salt of an alpha-ethoxy-alpha-carboxybenzylmagnesium halide.

*Alpha-(1-naphthyl)-alpha - benzyl - beta - hydroxypropionic acid,* prepared from (1-naphthyl)-benzylacetic acid by way of the intermediate alpha-benzyl-alpha-carboxy-(1-naphthyl)methylmagnesium halide.

*Alpha-(3-thienyl) - beta - hydroxypropionic acid,* prepared from 3-thienyl-acetic acid by way of intermediate alpha-carboxy-(3-thenyl)magnesium halide.

*Alpha-bis(p-xenyl)-beta - hydroxypropionic acid,* prepared from bis(p-xenyl)acetic acid by way of the intermediate salt of an alpha-(p-xenyl)-alpha-carboxy-(p-xenyl)methylmagnesium halide.

*Alpha-(2-thienyl)-alpha-phenethyl - beta - hydroxypropionic acid,* prepared from 2-thienyl-(2-phenethyl)acetic acid by way of the intermediate salt of an alpha-(2-phenethyl)-alpha-carboxy-(2-thenyl)magnesium halide.

*Alpha-(2-thienyl)-alpha-(1-naphthyl) - beta - hydroxypropionic acid,* prepared from 2-thienyl-1-naphthylacetic acid by way of the intermediate salt of an alpha-(1-naphthyl)-alpha-carboxy-(2-thenyl)magnesium halide.

*Alpha-(2-thienyl)-alpha-(o - tolyloxy) - beta-hydroxypropionic acid,* prepared from 2-thienyl-o-tolyloxyacetic acid by way of the intermediate salt of an alpha-(o-tolyloxy)-alpha-carboxy-(2-thenyl)magnesium halide.

*Alpha-(5-methyl - 2 - thenyl) - beta - hydroxypropionic acid,* prepared from (5-methyl-2-thienyl)acetic acid by way of the intermediate salt of an alpha-carboxy-(5-methyl-2-thenyl)magnesium halide.

*Alpha-(3-tertiary-butyl-1-naphthyl)-beta - hydroxypropionic acid,* prepared from (3-tertiary-butyl-1-naphthyl)-acetic acid by way of the intermediate salt of an alpha-carboxy-(3-tertiary-butyl-1 - naphthyl)methylmagnesium halide.

I claim:

1. In a process for preparing an acid having the formula

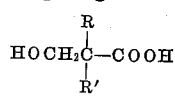

wherein R is a member of the class consisting of aromatic hydrocarbon groups of 1–2 rings having less than 15 carbon atoms, thienyl groups, and lower-alkylated thienyl groups; and R' is a member of the class consisting of hydrogen, lower-alkyl groups, lower-alkoxy groups, thienyl groups, lower-alkylated thienyl groups, and aromatic hydrocarbon, aromatic hydrocarbon-oxy, and aromatic hydrocarbon-lower-alkyl groups wherein the aromatic radical comprises 1–2 rings having less than 15 carbon atoms, the steps which comprise reacting formaldehyde with a salt of an acid having the formula

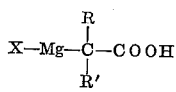

wherein X is halogen, and hydrolyzing the resulting complex.

2. In a process for preparing tropic acid, the steps which comprise reacting formaldehyde with a salt of an alpha-carboxybenzylmagnesium halide, and hydrolyzing the resulting complex.

3. In a process for preparing alpha-(2-thienyl)-beta-hydroxypropionic acid, the steps which comprise reacting formaldehyde with a salt of an alpha-carboxy-(2-thenyl)-magnesium halide, and hydrolyzing the resulting complex.

4. In a process for preparing alpha-(p-xenyl)-beta-hydroxypropionic acid, the steps which comprise reacting formaldehyde with a salt of an alpha-carboxy-(p-xenyl)methylmagnesium halide, and hydrolyzing the resulting complex.

5. In a process for preparing alpha,alpha-diphenyl-beta-hydroxypropionic acid, the steps which comprise reacting formaldehyde with a salt of an alpha-phenyl-alpha-carboxybenzylmagnesium halide, and hydrolyzing the resulting complex.

6. In a process for preparing alpha-benzyl-alpha-phenyl-beta-hydroxypropionic acid, the steps which comprise reacting formaldehyde with a salt of an alpha-benzyl-alpha-carboxybenzylmagnesium halide, and hydrolyzing the resulting complex.

7. In a process for preparing alpha-phenyl-alpha-phenoxy-beta-hydroxypropionic acid, the steps which comprise reacting formaldehyde with a salt of an alpha-phenoxy-alpha-carboxybenzylmagnesium halide, and hydrolyzing the resulting complex.

8. In a process for preparing tropic acid, the steps which comprise reacting formaldehyde with the sodium salt of alpha-carboxybenzylmagnesium chloride, and hydrolyzing the resulting complex.

9. The process for preparing an acid having the formula

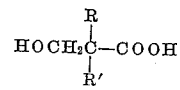

wherein R is a member of the class consisting of aromatic hydrocarbon groups of 1–2 rings having less than 15 carbon atoms, thienyl groups, and lower-alkylated thienyl groups; and R' is a member of the class consisting of hydrogen, lower-alkyl groups, lower-alkoxy groups, thienyl groups, lower-alkylated thienyl groups, and aromatic hydrocarbon, aromatic hydrocarbon-oxy, and aromatic hydrocarbon-lower-alkyl groups wherein the aromatic radical comprises 1–2 rings having less than 15 carbon atoms, which comprises reacting a compound having the formula

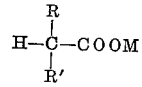

wherein M is a cation, with magnesium and a lower-alkyl halide, reacting the resulting organometallic compound with formaldehyde, and hydrolyzing the resulting complex.

10. The process for preparing tropic acid which comprises reacting a compound having the formula

C₆H₅CH₂COOM where M is a cation, with magnesium and a lower-alkyl halide, reacting the resulting salt of an alpha-carboxybenzylmagnesium halide with formaldehyde, and hydrolyzing the resulting complex.

11. The process for preparing tropic acid which comprises reacting sodium phenylacetate with magnesium and a lower-alkyl halide, reacting the resulting sodium salt of an alpha-carboxybenzylmagnesium halide with formaldehyde, and hydrolyzing the resulting complex.

12. The process for preparing tropic acid which comprises reacting calcium phenylacetate with magnesium and a lower-alkyl halide, reacting the resulting calcium salt of an alpha-carboxybenzylmagnesium halide with formaldehyde, and hydrolyzing the resulting complex.

13. The process for preparing tropic acid which comprises reacting ammonium phenylacetate with magnesium and a lower-alkyl halide, reacting the resulting ammonium salt of an alpha-carboxybenzylmagnesium halide with formaldehyde, and hydrolyzing the resulting complex.

14. The process for preparing tropic acid which comprises reacting sodium phenylacetate with magnesium and isopropyl chloride, reacting the resulting sodium salt of alpha-carboxybenzylmagnesium chloride with formaldehyde, and hydrolyzing the resulting complex.

References Cited in the file of this patent

UNITED STATES PATENTS 2,331,677   Hanslick _____ Oct. 12, 1943

OTHER REFERENCES

Norris, "Org. Chemistry," (McGraw-Hill), pp. 125 (1922).
Ivanov, Chem. Ab., vol. 31, p. 5788 (1937).
Roberts et al., J. Am. Chem. Soc., vol. 67, pp. 148–50 (1945).
Stefanova, Chem. Abstracts, vol. 42, pp. 4156–7 (1948).
Mousseron et al., Bull. Soc. Chem., France, 1948, pp. 91–6.